United States Patent Office  3,546,259
Patented Dec. 8, 1970

3,546,259
SELECTED 6β- AND 6α-TRIFLUOROMETHOXYL ANDROSTANE, ESTRANE AND PREGNANE DERIVATIVES
George A. Boswell, Jr., Wilmington, and William C. Ripka, Newark, Del., assignors to E. I. du Pont de Nemours and Company, Wilmington, Del., a corporation of Delaware
No Drawing. Filed Nov. 8, 1968, Ser. No. 774,531
Int. Cl. C07c 169/06
U.S. Cl. 260—397.4   20 Claims

ABSTRACT OF THE DISCLOSURE

Described and claimed are the 6α- and 6β-trifluoromethoxyl steroids of the formulas

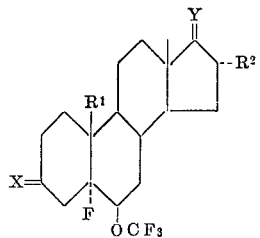

and

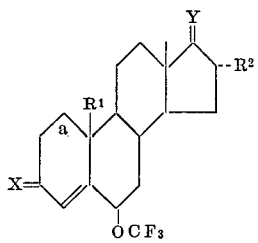

wherein $R^1$ and $R^2$, which may be the same or different, are hydrogen or methyl;
X is

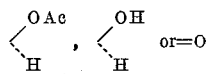

Y is

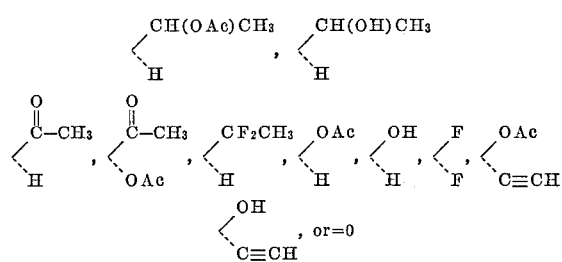

Ac is acetyl; and
$a$ is a single or a double carbon-carbon bond, with the proviso that when $a$ is a double bond, $R^1$ is methyl.

The trifluoromethoxyl androstanes of this invention possess anti-androgenic activity while the corresponding estrane and pregnane derivatives of this invention possess progestational, anti-fertility and anti-estrogenic activity.

BACKGROUND OF THE INVENTION

Field of the invention

This invention relates to selected biologically active steroid compounds and more particularly to certain 6α- and 6β-trifluoromethoxyl androstane, estrane and pregnane derivatives possessing anti-androgenic, progestational, anti-fertility and anti-estrogenic activities.

Description of the prior art

As fas as is known the compounds of this invention are new, no reference to them existing in the patent or general chemical literature.

SUMMARY AND DETAILS OF THE INVENTION

The new compounds of this invention are selected 6α- and 6β-trifluoromethoxyl androstane, estrane and pregnane derivatives of the formulas

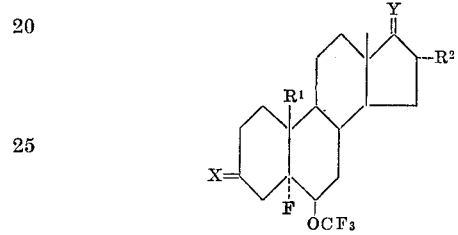

and

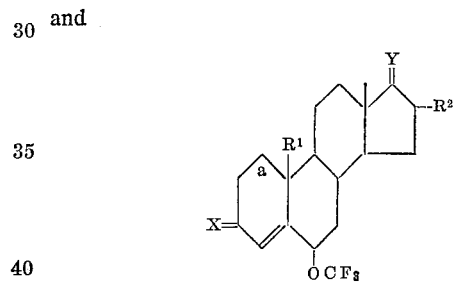

wherein $R^1$ and $R^2$, which may be the same or different, are hydrogen or methyl;
X is

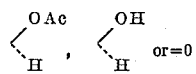

Y is

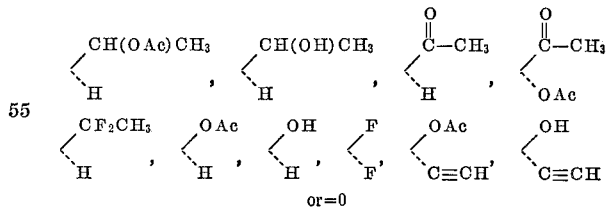

Ac is acetyl; and
$a$ is a single or a double carbon-carbon bond, with the proviso that when $a$ is a double bond, $R^1$ is methyl.

6-trifluoromethoxyl steroids are obtained from the corresponding 6-fluoroformates (prepared by reaction of 6-hydroxy derivatives with carbonyl fluoride) by reaction with sulfur tetrafluoride and hydrogen fluoride. Thus any 6-hydroxy steroid can be converted to its trifluoromethyl derivative. Should the fluoroformate starting material have any functional groups reactive toward sulfur tetrafluoride, these groups may be suitably protected by the preparation of derivatives non-reactive toward $SF_4$.

A particularly versatile synthetic sequence to the compounds of this invention starts with a 3-acetoxy-Δ⁵ steroid. This compound is reacted with nitrosyl fluoride followed by hydrolysis of the resulting 6-nitrimino group to give the 5α-fluoro-6-ketone. This 6-keto derivative is reduced to the corresponding alcohol with, among other reagents, sodium borohydride in methanol. The 6-fluoroformate is then obtained by reaction of the alcohol with carbonyl fluoride. Reaction of the 5α-fluoro-6-fluoro-formate with sulfur tetrafluoride and hydrogen fluoride gives the 5α-fluoro-6-trifluoromethoxyl steroid. The protecting 3-acetate is hydrolyzed, the resulting alcohol is oxidized to the ketone and this 3-keto-5α-fluoro-6-trifluoromethoxyl steroid is treated with base to give the 6-trifluoromethoxyl-Δ⁴-3-one steroid. Treatment with acid then gives the 6α-substituted compound.

The foregoing reaction sequence is illustrated as follows:

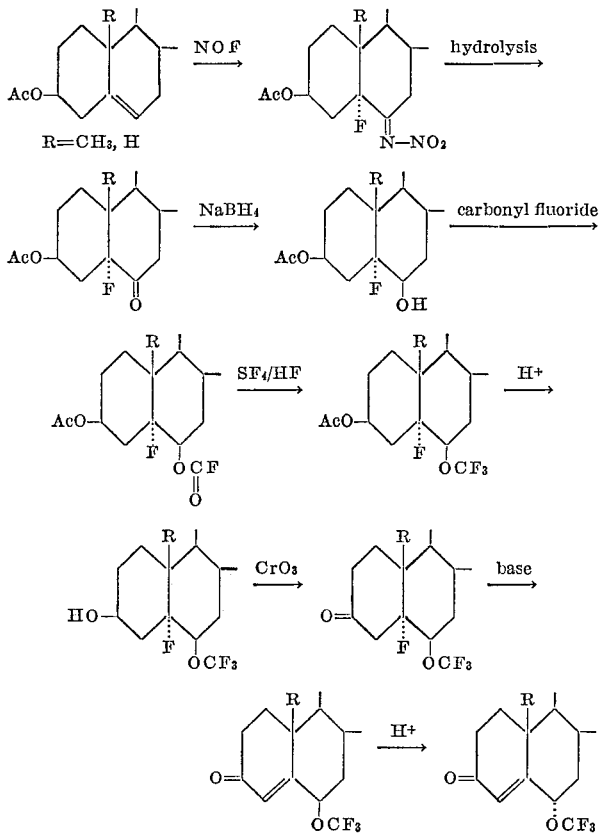

Another useful synthetic route to the compounds of this invention starts with the 6-hydroxy-Δ⁴-3-one steroid. Reaction with carbonyl fluoride gives the 6-fluoroformate. Treatment with sulfur tetrafluoride and hydrogen fluoride leads directly to the 6-trifluoro-methoxyl-Δ⁴-3-one steroid as shown in the following:

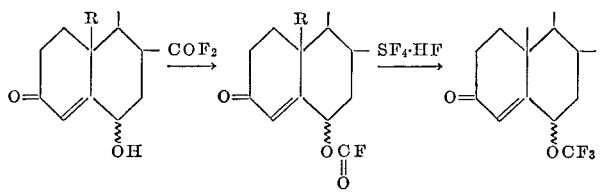

EMBODIMENTS OF THE INVENTION

Details relating to the preparation of the steroid compounds of this invention are set forth in the following nonlimiting examples.

EXAMPLE I 3,20-dihydroxy-5α-fluoro-6β-trifluoromethoxyl-16α-methylpregnane diacetate

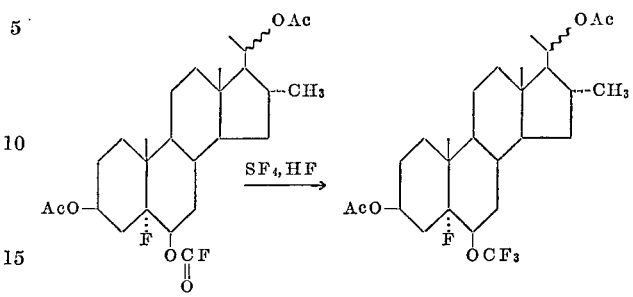

3β,20-dihydroxy-5α-fluoro-6β-fluoroformyl-16α-methylpregnane diacetate (23 g.) prepared as described below was dissolved in 150 ml. of methylene chloride and reacted with 50 g. of anhydrous hydrogen fluoride and 1000 g. of sulfur tetrafluoride for 65 hours at 20±2° C. The resulting black reaction mixture was poured into water. The aqueous portion was extracted with two 250 ml. portions of methylene chloride. The combined methylene chloride extracts were washed with two 250 ml. portions of saturated sodium bicarbonate solution and with two 250 ml. portions of saturated sodium chloride solution. Drying over anhydrous magnesium sulfate and evaporation of the solvent gave 5 g. of a black oil. This oil was chromatographed on 300 g. of "Florisil" and eluted with acetone-hexane mixtures (from 0 to 5%) to yield 2 g. of 3,20-dihydroxy-5α-fluoro-6β-trifluoromethoxyl-16α-methylpregnane diacetate as a reddish oil.

Infrared: $\lambda_{max.}^{neat}$ 8.75μ (—OCF₃), 5.80μ $\left(-O\overset{O}{\overset{\|}{C}}CH_3\right)$ The fluoroformate used as starting material in Example I was prepared by the following series of reactions:

(A) 16α-methylpregn-5-en-3,20-diol

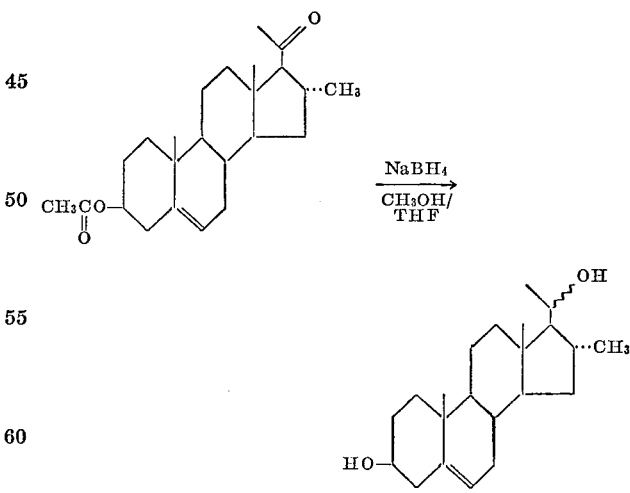

To a solution of 50 g. of 16α-methylpregnenolone acetate in 600 ml. of tetrahydrofuran and 500 ml. of methanol there was added 1.5 g. of solid sodium borohydride. The solution was stirred overnight at room temperature. An additional 1.0 g. of sodium borohydride was added and the mixture stirred an additional hour. This mixture was concentrated to a slurry on a rotary evaporator, then poured into one liter of water. It was stirred overnight, then filtered and dried to yield 63 g. of a white solid.

Infrared: $\lambda_{max.}^{Nujol}$ 2.95μ (—OH), 6.10μ $\left(\diagdown C=C\diagup\right)$ (B) 16α-methylpregn-5-en-3β,20δ-diol diacetate

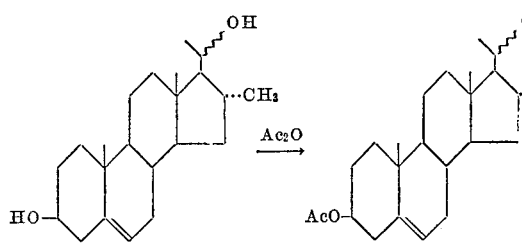

The 63 g. of diol from part (A) was dissolved in 500 ml. of acetic anhydride, refluxed for 2 hours and allowed to stand at room temperature overnight. The solution was then concentrated under vacuum (pump). Two liters of water were added and the mixture stirred for 3 hours. The white solid was filtered and air-dried, its weight being 52.3 g.

An analytical sample was crystallized from acetone-hexane to give small clusters of needles, M.P. 106–110°.

*Analysis.*—Calcd. for $C_{26}H_{40}O_4$ (percent): C, 74.95; H, 9.68. Found (percent): C, 74.68, 75.06; H, 9.56, 9.69.

Infrared: $\lambda_{max.}^{CHCl_3}$ 5.81μ (C=O), 5.99μ (unconj. C=C)

(C) 3,20 - dihydroxy-5α-fluoro-16α-methyl-pregn-6-one diacetate

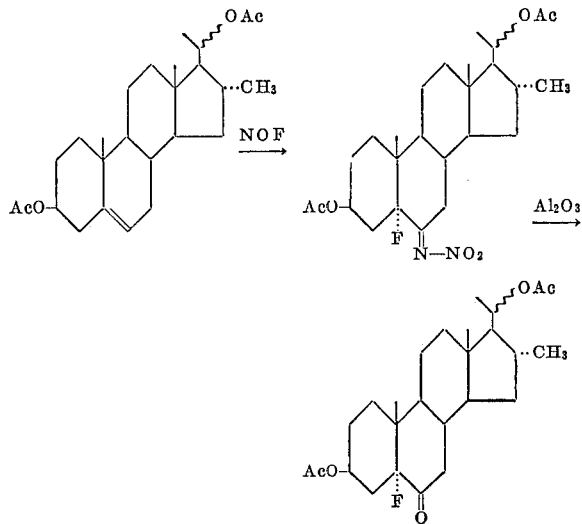

The 52.3 g. of diacetate from part (B) was dissolved in 150 ml. of methylene chloride and cooled to 0°. Nitrosyl fluoride (19 g.) was slowly bubbled into the solution. The reaction mixture was allowed to stand overnight and was then poured into water. The methylene chloride layer was separated, washed with water and saturated sodium chloride solution and finally dried over anhydrous magnesium sulfate. The methylene chloride solution was concentrated go give an oil. A small sample of this oil was crystallized from acetone-hexane, M.P. 189–191, $[\alpha]_D^{23}$ —76° (c. 1.41 chf.).

*Analysis.* — Calcd. for $C_{26}H_{39}O_6FN_2$ (percent): C, 63.13; H, 7.95; F, 3.84; N, 5.66. Found (percent): C, 63.41, 63.45; H, 7.51, 7.69; N, 5.08, 5.06.

Infrared: $\lambda_{max.}^{Nujol}$ 5.78μ (ester C=O), 6.10μ (C=N), 6.33 and 7.62μ (No₂), 8.75μ (C—F)

Ultraviolet: $\lambda_{max.}^{EtOH}$ 267 mμ (ϵ 504)

The above oil was chromatographed on 1300 g. of grade III alumina with hexane-benzene mixtures to afford 43 g. of a yellow-white solid. Recrystallization from acetone-hexane gave 29 g. of fine white needles, M.P. 166–176°, $[\alpha]_D^{23}$+2° (c. 1.28 chf.).

*Analysis.*—Calcd. for $C_{26}H_{39}O_5F$ (percent): C, 69.30; H, 8.73; O, 17.76; F, 4.22. Found (percent): C, 69.56, 69.68; H, 8.71, 8.77; F, 4.69.

Infrared: $\lambda_{max.}^{CHCl_3}$ 5.80μ (C=O)

(D) 3β,6β,20δ-trihydroxy - 5α - fluoro-16α-methylpregnane 3,20-diacetate

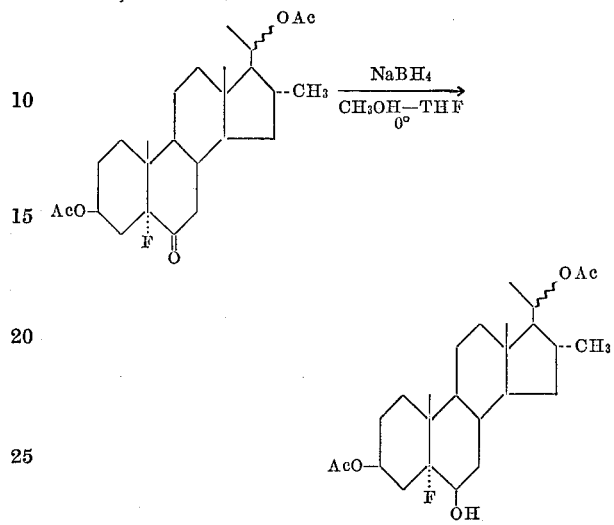

To a solution of 34.2 g. of the fluoroketone of Part (C) in 500 ml. of methanol and 200 ml. of tetrahydrofuran, cooled to 0°, there was added 1.08 g. of solid sodium borohydride. The mixture was stirred for 2 hours at 0°. Cold concentrated hydrochloric acid (1.3 ml.) was added, and the solution was concentrated to a slurry. It was poured into 800 ml. of 5% acetic acid, and the resulting precipitate was filtered, washed with water, and dried to yield ca. 36 g. of solid. An analytical sample was recrystallized twice from methanol, M.P. 187–190°.

*Analysis.*—Calcd. for $C_{26}H_{39}O_5F$ (percent): C, 69.30; H, 8.73; F, 4.21. Found (percent): C, 69.01, 69.39; H, 8.97, 9.27; F, 4.05.

Infrared: $\lambda_{max.}^{CHCl_3}$ 2.77 and 2.86μ (—OH), 5.79μ (este C=O), 7.98μ (acetate C—O)

(E) 3β,6β,20-trihydroxy-5α-fluoro-16α-methylpregnane 6-fluoroformate 3,20-diacetate

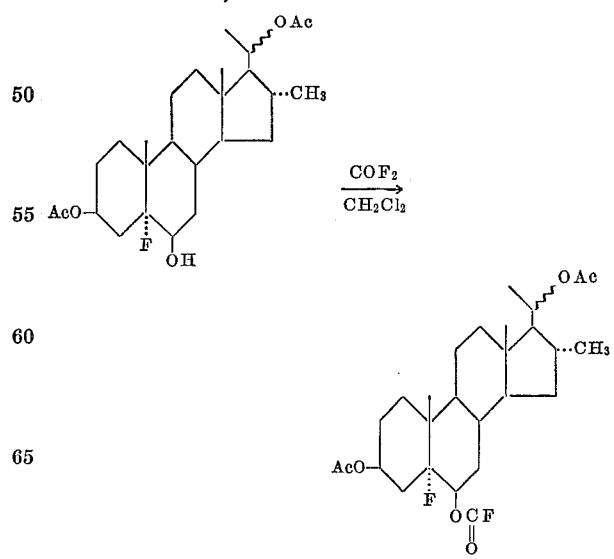

A solution of 30.5 g. 3β,6β20-trihydroxy-5α-fluoro-16α-methylpregnane 3,20-diacetate from Part (D) in 100 ml. of methylene chloride was allowed to react with 100 g. of carbonyl fluoride for 20 hours at room temperature. The reaction mixture was poured into water. The methylene chloride layer was separated and washed with three 100 ml. portions of water, two 100 ml. portions of saturated sodium bicarbonate solution and finally with a 250 ml. portion of saturated sodium chloride solution. When dried over anhydrous magnesium sulfate and concentrated the methylene chloride layer afforded 23 g. of 3β,20-dihydroxy - 5α - fluoro - 6β - fluoroformyl - 16α - methylpregnane diacetate. An analytical sample was obtained by recrystallization from acetone-hexane to give white needles, M.P. 197–200°.

Analysis.—Calcd. for $C_{27}H_{40}O_6F_2$ (percent): C, 65.04; H, 8.07; F, 7.62. Found (percent): C, 65.15, 65.16; H, 7.87, 7.97; F, 7.60, 7.78.

Infrared: $\lambda_{max}^{CHCl_3}$ 5.46μ $\left(\substack{O \\ \parallel \\ OCF}\right)$, 5.78μ (ester C=O), 7.95 and 9.70μ (C—O—C), 8.5 to 9.0μ (C—F)

EXAMPLE II 3,20-dihydroxy-5α-fluoro-6β-trifluoromethoxyl-16α-methylpregnane

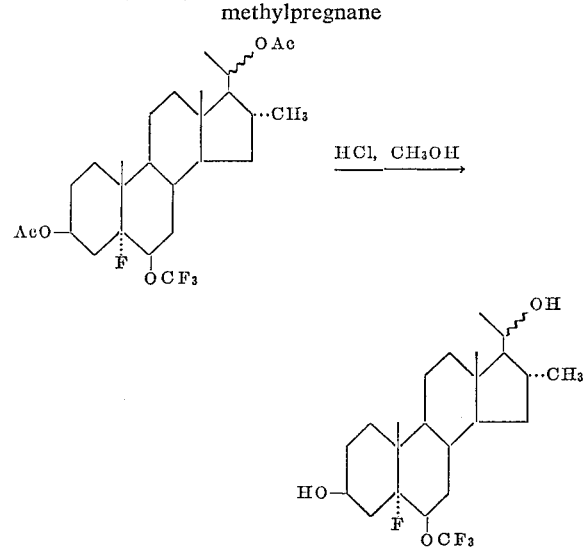

Two grams of the trifluoromethoxyl steroid of Example I were taken up in 100 ml. of methanol and 20 ml. of concentrated hydrochloric acid. The solution was warmed on a steam bath for 1 hour, then allowed to stand at room temperature overnight. The reaction mixture was poured into 600 ml. of water and extracted with five 100 ml. portions of methylene chloride. The combined methylene chloride extracts were washed with two 100 ml. portions of water and saturated sodium chloride solution, dried over anhydrous magnesium sulfate and evaporated to yield 1.24 g. of 3,20-dihydroxy-5α-fluoro - 6β - trifluoromethoxyl-16α-methylpregnane as a yellow oil.

Infrared: $\lambda_{max}^{neat}$ 2.90μ (—OH), 5.80μ $\left(\substack{O \\ \parallel \\ OCCH_3}\right)$, 8.75μ (—OCF₃)

EXAMPLE III

5α-fluoro-6β-trifluoromethoxyl-16α-methyl-pregna-3,20-dione

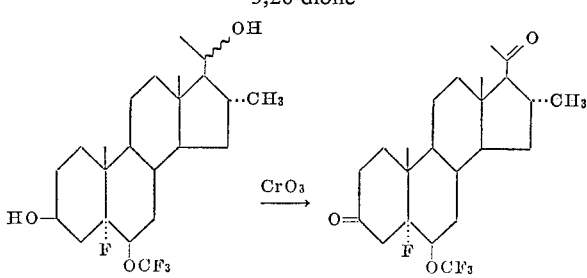

The diol (1.24 g.) from Example II was dissolved in 100 ml. of acetone and cooled to 0°. Excess Jones reagent was added dropwise. The resulting solution was allowed to stir for 30 minutes at 0°, and then methanol was added to destroy excess oxidizing agent. The solution was filtered to remove salts, diluted with 600 ml. of water and extracted with methylene chloride to give 1.035 g. of 5α - fluoro-6β-trifluoromethoxyl-16α-methylpregna-3,20-dione as a yellow oil.

Infrared: $\lambda_{max}^{neat}$ 5.80μ (C=O), 8.75μ (OCF₃)

EXAMPLE IV

16α-methyl-6β-trifluoromethoxylprogesterone

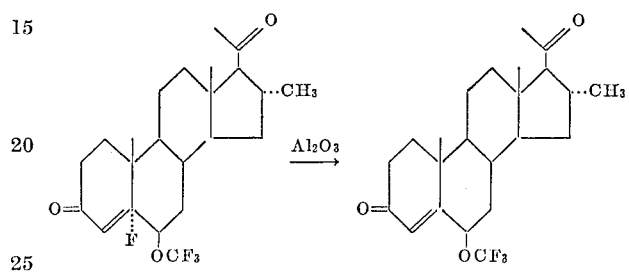

The trifluoromethoxyl steroid (1.035 g.) from Example III was chromatographed on 30 g. of grade III alumina and eluted with hexane-benzene mixtures to give 305 mg. of solid material. Two recrystallizations from acetone-hexane gave 150 mg. of fine, colorless needles of 16α-methyl - 6β - trifluoromethoxylprogesterone, M.P. 170.0–170.5.

Infrared: $\lambda_{max}^{Nujol}$ 5.80μ (C-20 C=O), 5.95μ (C-3 conjugated C=O), 8.75μ (OCF₃)

Analysis.—Calcd. for $C_{23}H_{31}O_3F_3$ (percent): C, 66.97; H, 7.57; O, 11.64; F, 13.82. Found (percent): C, 67.13, 66.90, 66.90; H, 7.51, 6.89, 7.66.

U.V.: $\lambda_{max}$ 232 mμ (ε 12,300), 290 mμ (ε 74), 330 mμ (ε 54).

EXAMPLE V

5α-fluoro-19-nor-androstane-3β,6β,17β-triol
3,17-diacetate 6-trifluoromethyl ether

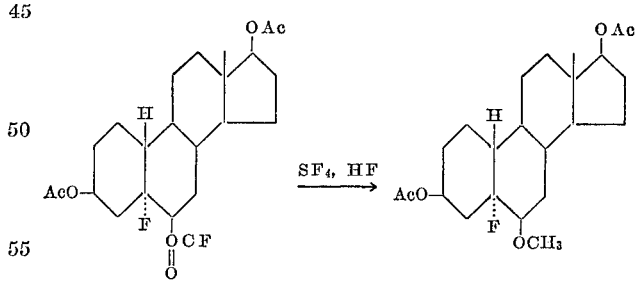

5α-fluoro-19-nor-androstane-3β,6β,17β-triol 3,17-diacetate 6-fluoroformate (3.18 g.), methylene chloride (75 ml.), anhydrous hydrogen fluoride (11 g.), and sulfur tetrafluoride (200 g.) were shaken for 65 hours at 20±2° in a sealed reactor. The separation procedure of Example I gave an oil which was chromatographed on 100 g. of "Florisil" and eluted with acetone-hexane mixtures yielding 550 mg. of product, M.P. 146–148° (from acetone-hexane), $[\alpha]_D^{24}+7°$ (c. 1.185 chf.) of 5α-fluoro-19-nor-androstane-3β,6β,17β-triol 3,17-diacetate 6-trifluoromethyl ether.

Analysis.—Calcd. for $C_{23}H_{32}O_5F_4$ (percent): C, 59.47; H, 6.95; F, 16.34. Found (percent): C, 59.42, 59.80; H, 6.78, 7.02; F, 15.30, 15.53.

Infrared: $\lambda_{max}$ 5.76μ (C=O); 8.04, 9.59μ (C—O—C), 8.7μ (CF₃)

N.M.R. (F¹⁹): 3,310 c.p.s. (singlet) and 10,410 c.p.s. (multiplet) from F 11.

The 5α-fluoro-19-nor-androstane-3β,6β,17β-triol 3,17-diacetate 6-fluoroformate used as starting material in Example V was obtained by the following reactions:

(A) Estr-5(6)-en-3β,17β-diol diacetate

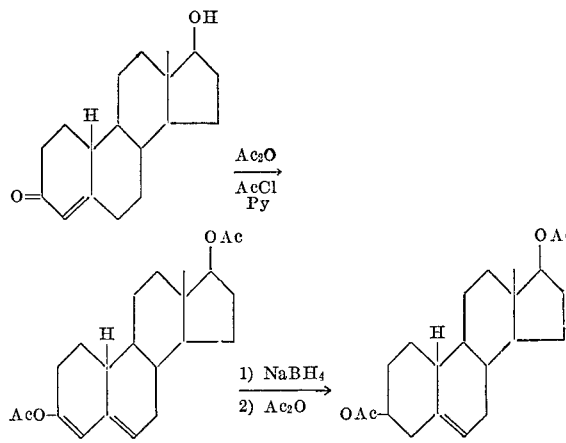

A solution of 141 g. of 19-nortestosterone, 100 ml. of acetic anhydride, 500 ml. of acetyl chloride and 50 ml. of pyridine was refluxed for 1½ hours and then allowed to stand overnight. It was then concentrated to a slurry and cooled in ice; 250 ml. of methanol were added. The precipitate formed was filtered and air dried to give 152 g. of a white solid. The filtrate was concentrated and cooled to give an additional 12 g. of product.

Infrared: $\lambda_{max.}^{Nujol}$ 5.75, 5.85μ $\left(CH_3\overset{O}{\underset{\|}{C}}O-\right)$; 6.05 (C=C)

In two separate runs 75 g. of the enol acetate was dissolved in a mixture of 500 ml. of tetrahydrofuran and 500 ml. of methanol. Sodium borohydride (86.3 g.), slurried in 150 ml. of water, was slowly added and the mixture stirred overnight. The mixture was concentrated under vacuum and diluted with water. The precipitate was filtered and dried.

Infrared: $\lambda_{max.}^{Nujol}$ 2.9 (O—H)

The combined products from the two runs were dissolved in 1000 ml. of acetic anhydride and refluxed for 45 minutes. The solution was concentrated under vacuum, diluted with water; the precipitate filtered and washed well with water. Crystallization from acetone-hexane yielded 63 g. of product.

(B) 5α-fluoro-3β,17β-dihydroxyestran-6-one diacetate

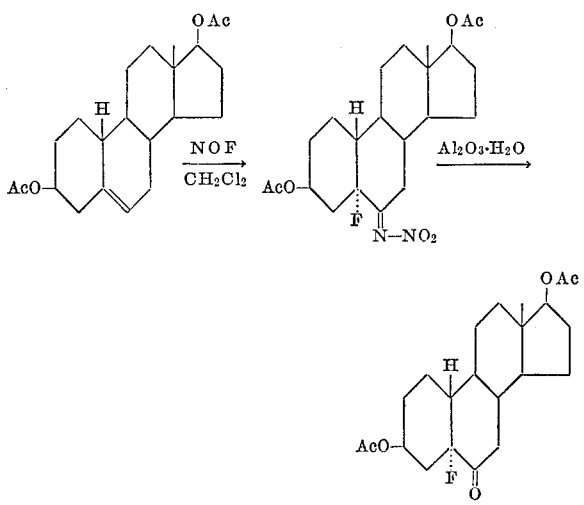

19-nor-5-androstene-3,17-diol diacetate (60 g.) in 200 ml. of methylene chloride cooled to 0° was reacted with 21 g. of nitrosyl fluoride. The reaction mixture was poured into water; the methylene chloride layer was washed with water and saturated sodium chloride solution and dried over anhydrous magnesium sulfate. Evaporation of the solvent gave a green oil. This oil was chromatographed on grade III alumina and eluted with benzene-hexane to yield 25.0 g., M.P. 173–174°.

(C) 5α-fluoro-19-nor-androstane-3β,6β,17β-triol 3,17-diacetate

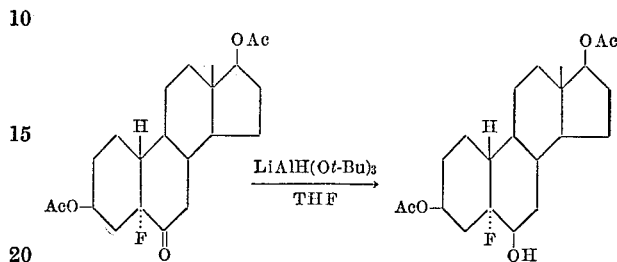

To a solution of 5α-fluoro-19-nor-androstane-6-one-3,17-diol diacetate (12 g.) in 400 ml. of tetrahydrofuran there was added 40 g. of lithium aluminum tri-t-butoxy hydride, and the mixture was stirred at room temperature for 48 hours. The reaction mixture was poured into 1.5 liters of 5% acetic acid and stirred at 0° for 2 hours. The precipitate was filtered and dried to yield 9.4 g. of product. Crystallization from acetone-hexane gave 6.0 g., M.P. 187–187.5(d), $[\alpha]_D^{24}+9°$ (c. 1.585 chf.).

Analysis.—Calcd. for $C_{22}H_{33}FO_5$ (percent): C, 66.64; H, 8.39; F, 4.80. Found (percent): C, 66.49, 67.17; H, 8.37, 8.51; F, 5.09, 5.05.

Infrared: $\lambda_{max.}^{KBr}$ 2.87μ (OH); 5.75, 5.82μ $\left(\overset{O}{\underset{\|}{O C}}CH_3\right)$; 7.95, 9.57μ

N.M.R. ($F^{19}$): 10,600 c.p.s. and 10,634 c.p.s. (possible doublet) from F 11

(D) 5α-fluoro-19-nor-androstane-3,6β-17-triol 3,17-diacetate fluoroformate

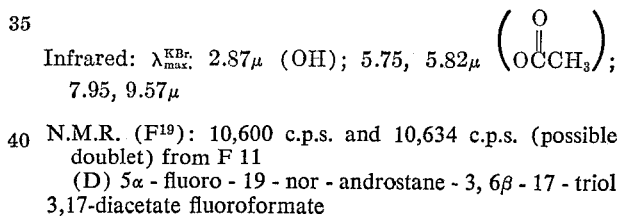

A solution of 5-α-fluoro-19-nor-androstane-3β,6β,17β-triol 3,17-diacetate (5.0 g.), 50 ml. of methylene chloride and 50 g. of carbonyl fluoride was reacted for 10 hours at room temperature in a sealed reactor. The reaction mixture was poured into water and the methylene chloride layer was washed with saturated sodium chloride solution, dried with anhydrous magnesium sulfate and concentrated. Crystallization from acetone-hexane gave white needles, M.P. 175–177°, $[\alpha]_D^{24}+1.0°$ (c. 1.525 chf.).

Analysis.—Calcd. for $C_{23}H_{32}F_2O_6$ (percent): C, 62.42; H, 7.29; F, 8.59. Found (percent): C, 63.05, 62.46; H, 7.43, 7.58; F, 8.60, 8.65.

Infrared: $\lambda_{max.}^{KBr}$ 5.47μ $\left(\overset{O}{\underset{\|}{O C}}F\right)$; 5.75μ (C=O); 8.0, 9.58μ (C—O—C)

N.M.R. ($F^{19}$): 9,645, 10.338, 880, 929 c.p.s. from F 11.

EXAMPLE VI

3β,6β,17β-trihydroxy-5α-fluoro-19-nor-androstane 6-trifluoromethyl ether

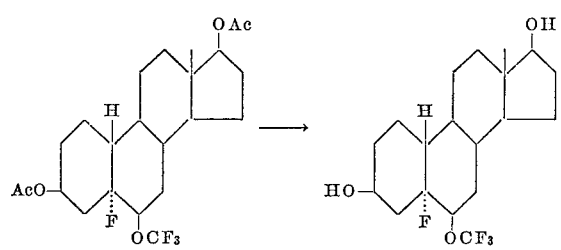

A solution of 1.3 g. of 6β-trifluoromethoxyl-5α-fluoro-3,17-dihydroxy-19-nor-androstane diacetate (Example V) in 120 ml. of methanol and 30 ml. of concentrated hydrochloric acid was heated for one hour on a steam bath and then allowed to stand at room temperature overnight. The reaction mixture was diluted with 2 liters of water and the precipitated solid collected to yield 165 mg.

Infrared: $\lambda_{max.}^{Nujol}$ 3.0μ ($C_{3,17}$—OH), 8.75μ ($OCF_3$)

The aqueous filtrate from the above was extracted several times with methylene chloride to give a yellow oil whose infrared spectrum indicated it to be a mixture of starting material and product. This oil was taken up in 120 ml. of methanol and 30 ml. of concentrated hydrochloric acid and was heated on a steam bath for one hour. It was allowed to stand overnight and then worked up as before to yield 0.6 g. of 3β,6β,17β-trihydroxy-5α-fluoro-19-nor-androstane 6-trifluoromethyl ether as a white solid.

Infrared: $\lambda_{max.}^{Nujol}$ 3.0μ ($C_{3,17}$—OH), 8.75μ ($OCF_3$)

EXAMPLE VII

5α-fluoroandrostane-3α,6β,17β-triol 6-trifluoromethyl ether 3,17-diacetate

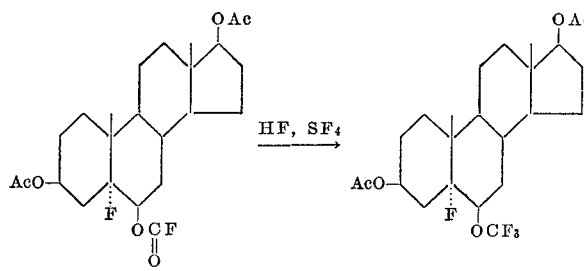

5α-fluoro-androstane-3,6,17-triol 6-fluoroformate 3,17-diacetate (25 g.) in 150 ml. of methylene chloride was reacted with 50 g. of anhydrous hydrogen fluoride and 1000 g. of sulfur tetrafluoride at 20±2° for 65 hours. The reaction mixture was poured into water, additional methylene chloride was added and the mixture was filtered. The methylene chloride layer was washed with saturated sodium bicarbonate solution, water and saturated sodium chloride solution and was dried over anhydrous magnesium sulfate. The solvent was evaporated. The resulting thick black oil was chromatographed on ca. 600 g. of "Florisil" and eluted with 2 liters of hexane, 1 liter of 1% acetone-hexane, 1 liter of 2% acetone-hexane, 1 liter of 3% acetone-hexane and 4% acetone-hexane until pure 6-trifluoromethoxyl steroid was no longer obtained. The crystalline fractions were combined and triturated with cold petroleum ether to remove the orange color yielding 4.8 g. of 5α-fluoroandrostane-3β,6β,17β-triol 6-trifluoromethyl ether 3,17-diacetate as a white solid.

Infrared: $\lambda_{max.}^{Nujol}$ 5.80μ (ester C=O), 8.75μ ($OCF_3$)

The fluoroformate steroid used as starting material in Example VII was obtained as follows:

(A) 5α-fluoroandrostane-6-one-3,17-diol diacetate

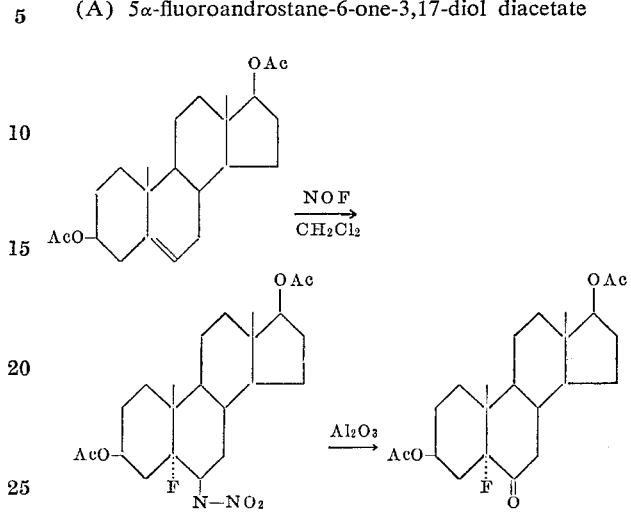

5-androsten-3,17-diol diacetate (100 g.) in 150 ml. of methylene chloride, cooled to 0°, was reacted with 33 g. of nitrosyl fluoride. Nine hours were required to pass this amount of nitrosyl fluoride into the solution after which time the reaction mixture was poured into water; the methylene chloride portion was washed with water and saturated sodium chloride solution and was dried over anhydrous magnesium sulfate. The solvent was evaporated to yield a green oil which was chromatographed on 1400 g. of Grade III alumina and eluted with hexane and hexane-benzene mixtures to yield 93 g. of a yellow-white product. Recrystallization from methanol yielded 47.8 g., M.P. 169–171°. A second crop of 16.1 g. was obtained, M.P. 163–166°.

(B) 5α-fluoroandrostan-3α,6β,17β-triol 3,17-diacetate

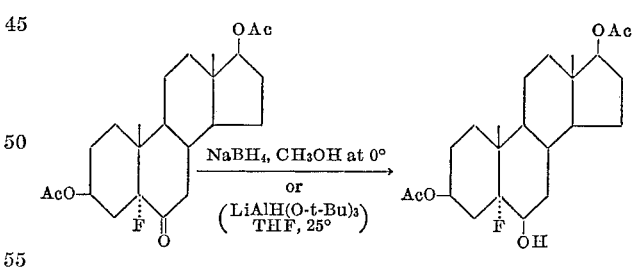

To a solution of 50 g. (0.122 mole) of 5α-fluoro-3β,17β-dihydroxyandrostan-6-one diacetate in 500 ml. of 95% ethanol and 300 ml. of tetrahydrofuran, cooled to 0°, there was added 5.25 g. (0.138 mole) of solid sodium borohydride, and the solution was stirred at 0° for one hour. Dilute hydrochloric acid was added to decompose the excess hydride, and the solution was concentrated. The resulting solid was slurried with water, filtered and dried. Recrystallization in acetone-hexane yielded 31.9 g. of product, M.P. 162–164°.

An alternative procedure involved the addition of solid lithium aluminum tri-t-butoxy hydride to a solution of 5α-fluoroandrostane-6-one-3,17-diol diacetate in anhydrous tetrahydrofuran. The mixture was stirred at room temperature for 48 hours and poured into 5% acetic acid. The granular solid was filtered, washed with water and dried. Crystallization in acetone-hexane yielded a white solid, M.P. 166–169°. A second crop was obtained, 3.55 g., M.P. 162–166°.

(C) 5α-fluoroandrostane - 3α,6β,17β - triol 6 - fluoroformate 3,17-diacetate

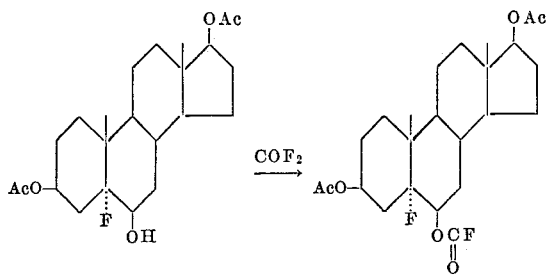

5α-fluoroandrostane-3,6,17 - triol 3,17 - diacetate (61.0 g.) in 300 ml. of methylene chloride was reacted with carbon fluoride for 20 hours at 25° in a sealed reactor. The reaction mixture was then poured into water and the methylene chloride portion washed with water, saturated sodium chloride and dried over anhydrous magnesium sulfate. Evaporation of the solvent and crystallization from acetone-hexane gave 55.0 g., M.P. 155–158°.

EXAMPLE VIII

5α-fluoroandrostane-3α,6β,17β-triol 6-Trifluoromethyl ether

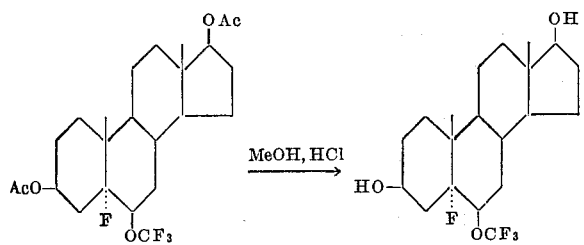

To a solution of 300 mg. of 5α-fluoroandrostane-3α,6β,17β-triol 6-trifluoromethyl ether 3,17-diacetate from Example VII in 20 ml. of methanol there was added 5 ml. of concentrated hydrochloric acid. The solution was heated at reflux for one hour and then allowed to stand overnight. Water was added to precipitate the product which was crystallized once from aqueous methanol and recrystallized from aceton-hexane to yield 200 mg. of white needles of 5α-fluoroandrostane-3α,6β,17β-triol 6-trifluoromethyl ether, M.P. 164–165°.

*Analysis.*—Calcd. for $C_{20}H_{30}F_4O_3$ (percent): C, 60.90; H, 7.67; F, 19.27. Found (percent): C, 59.83, 59.49; H, 7.80, 7.81; F, 19.35, 19.24.

Infrared: $\lambda_{max.}^{Nujol}$ 3.05μ (—OH), 7.83μ (—O—C—) 8.75 (—CF$_3$), 9–10μ (C—OH)

EXAMPLE IX

5α-fluoroandrostan-6β-ol-3,17-dione trifluoromethyl ether

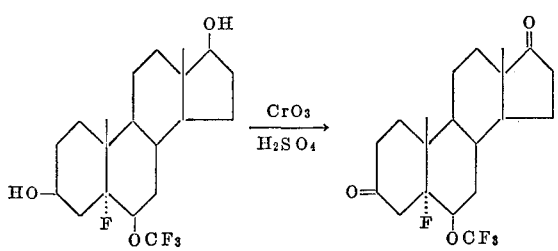

To a solution of 96.7 mg. 5α-fluoroandrostane-3α,6β,17β-triol 6-trifluoromethyl ether from Example VIII in 25 ml. of acetone, cooled to 0°, there was added Jones reagent until a persistent red color was obtained. The solution was stirred for 15 minutes; then methanol was added to destroy excess oxidizing reagent. The inorganic salts were filtered off and water was added to the filtrate until precipitation of the product was complete. Sublimation of a small amount of the crude product yielded an analytical sample, M.P. 176–178° of 5α-fluoroandrostan-6β-ol-3,17-dione trifluoromethyl ether.

*Analysis.*—Calcd. for $C_{20}H_{26}F_4O_3$ (percent): C, 61.53; H, 6.71; F, 19.47. Found (percent): C, 61.77, 61.64; H, 6.82, 6.86; F, 19.58.

Infrared: $\lambda_{max.}$ 5.73, 5.77μ (sat'd C=O's), 7.82μ (O—C—), 8.75μ (CF)$_3$

EXAMPLE X 4-androsten-6β-ol-3,17-dione trifluoromethyl ether

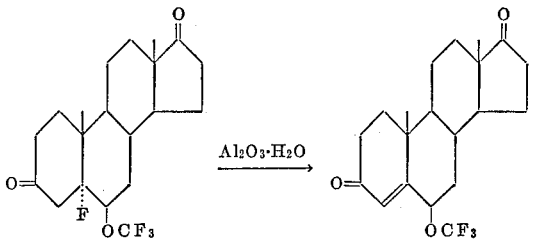

5α-fluoroandrostan-6β-ol - 3,17 - dione trifluoromethyl ether (0.872 g.) from Example IX was chromatographed on 60 g. of grade III alumina using benzene as eluant. Recrystallization in acetone-hexane yielded a total of 549 mg. M.P. 170–172°, $[\alpha]_D^{24}$ +74° (c. 1.65 chf.) of 4-androst-4-ene 3,17-dione trifluoromethyl ether.

*Analysis.*—Calcd. for $C_{20}H_{25}O_3F_3$ (percent): C, 64.85; H, 6.80; F, 15.39. Found (percent): C, 64.96, 64.28; H, 6.79, 6.83; F, 15.75.

Infrared: $\lambda_{max.}$ 3.29μ (=C—H), sat'd 5.76μ ($C_{17}$=O), 5.95μ (unsat'd $C_3$=O), 6.18μ (C=C), 7.81μ (—O—C)

Ultraviolet: $\lambda_{max.}^{EtOH}$ 232 mμ (ε 11, 600), 330 mμ (sh. ε 35), 288 mμ (ε 83)

N.M.R.: τ4.1 (singlet, 1H), τ5.2 (multiplet, 1H), τ7.3–9.5 (multiplet 23H)

F$^{19}$N.M.R.: +3291 (OCF$_3$).

EXAMPLE XI 4-androsten-3α,6β,17β-triol 6-trifluoromethyl ether

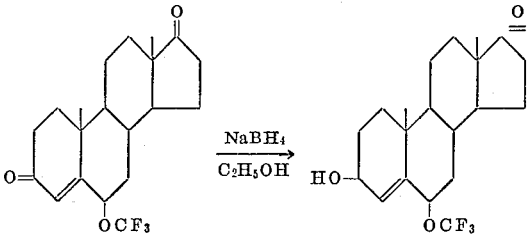

To a solution of 5.496 g. (14.8 mmole) of 4-androsten-3,17-dione-6β-ol trifluoromethyl ether in 250 ml. of ethanol, cooled to 0°, there was added 3.0 g. of solid sodium borohydride. The reaction mixture was stirred for 2 hours at 0°, then poured into ice-water and filtered to give 5.35 g. of 4-androsten-3α,6β,17β-triol 6-trifluoromethyl ether as a white solid.

Infrared: $\lambda_{max.}^{Nujol}$ 3.10μ (OH), 6.0μ (C=C), 8.80μ (OCF$_3$)

EXAMPLE XII

6β,17β-dihydroxyandrost-4-en-3-one 6-trifluoromethyl ether

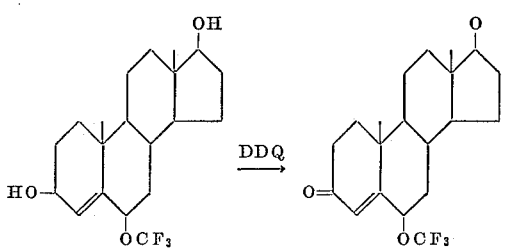

To a solution of 5.35 g. of 4-androsten-3α,6β,17β-triol 6-trifluoromethyl ether in 500 ml. of dioxane there was added 5.6 g. of dicyanodichloroquinone, and the mixture was stirred for 5 days at room temperature. Benzene (500 ml.) was added, and the solution was extracted repeatedly with saturated sodium bicarbonate solution, with cold 5% sodium hydroxide solution and finally with saturated sodium chloride solution. The organic solution was dried with anhydrous magnesium sulfate and concentrated to give 6.0 g. of a yellow liquid which crystallized on standing. The material was chromatographed on "Florisil" to yield 4.40 g. of white solid which was crystallized from acetone-hexane to yield fine white needles of 6β,17β-dihydroxyandrost-4-en-3-one 6-trifluoromethyl ether, M.P. 153–154.5°, $[\alpha]_D^{24}$ +14° (c. 1.25 chf.).

Analysis.—Calc'd for $C_2H_{27}O_3F_3$ (percent): C, 64.50; H, 7.31; F, 15.30. Found (percent): C, 64.70; H, 7.18; F, 15.18.

Infrared: $\lambda_{max.}^{CHCl_3}$ 2.78, 2.91μ (O—H), 5.91μ (unsat'd $C_3$=O), 6.17μ (C=), 7.85, 7.94μ (O—C—)

Ultraviolet $\lambda_{max.}^{EtOH}$ 233 mμ (ε 11,900), 330 mμ (ε 38)

H' N.M.R.: τ 9.17 (singlet, 3H), τ 8.70 (singlet, 3H), τ 6.30 (triplet, J~8 c.p.s., 1H), τ 5.20 (multiplet, 1H), τ 4.12 (singlet, 1H).

$F^{19}$ N.M.R. (56.4 mc.): +3289 c.p.s. from F 11

EXAMPLE XIII 17,17-difluoro-6β-hydroxy-4-androsten-3-one trifluoromethyl ether

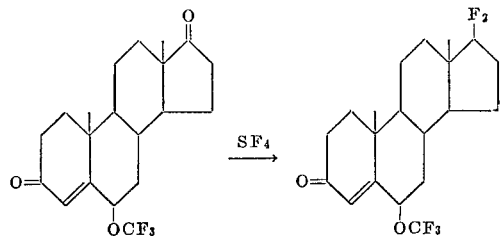

A mixture of 1.0 g. of 6β-trifluoromethoxyandrostendione from Example X, 0.7 ml. of water, 3.5 ml. of tetrahydrofuran, 20 ml. of methylene chloride and 46 g. of sulfur tetrafluoride was shaken for 10 hours at 20±2°. The separation procedure of Example I gave a semi-solid mass whose infrared spectrum indicated it was primarily unreacted starting material. The above reaction was repeated using the recovered steroid (1.0 g.), 1.7 ml. of water (instead of 0.7 ml.), 20 μl. of methylene chloride and 46 g. of sulfur tetrafluoride. The mixture was shaken at 20±2° for 24 hours. Separation and chromatography on "Florisil" gave a white solid material. Crystallization from hexane gave 53.5 mg. (first crop), M.P. 108–110°. The mother liquors were subjected to preparative chromatography (silica gel G using 12% ethyl acetate/chloroform) to give an additional 113 mg. of pure material. Crystallization from acetone-hexane gave 60 mg. of 17,17-difluoro-6β-trifluoromethoxy-4-androsten-3-one.

Analysis.—Calc'd for $C_{20}H_{25}O_2F_5$ (percent): C, 61.22; H, 6.42; F, 24.21. Found (percent): C, 60.80, 61.01; H, 6.36, 6.50.

Infrared: $\lambda_{max.}^{KBr}$ 5.92μ ($C_3$=O), 6.12μ ($C_4$=$C_5$), 7.8μ (OCF$_3$)

Ultraviolet $\lambda_{max.}^{EtOH}$ 330mμ (ε 47), 232 mμ (ε 13,400)

N.M.R. ($H^1$): H–18 (doublet at 0.97 p.p.m., J=2 c.p.s.), H–19 (1.33 p.p.m.) H–6 (multiplet at 4.82 p.p.m.), H–4 (5.92 p.p.m.)

EXAMPLE XIV 20,20-difluoro-6α-hydroxy-4-pregnen-3-one 6-trifluoromethyl ether

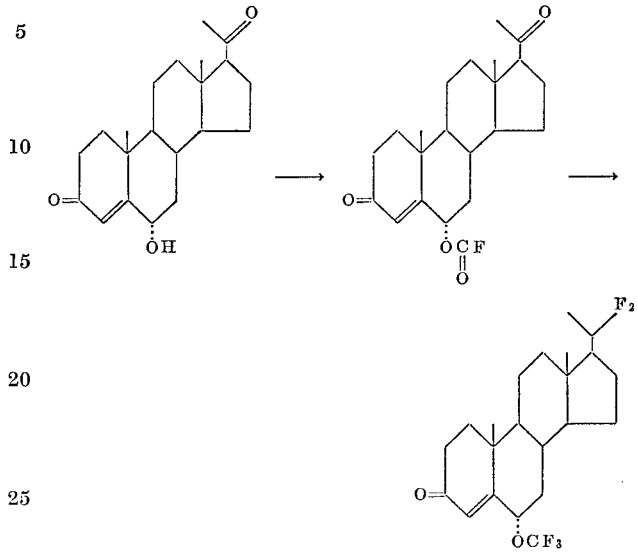

A solution of 2.0 g. of 6α-hydroxy-progesterone in 50 ml. of methylene chloride was reacted overnight at ambient temperature with 30 g. of carbonyl fluoride. The excess carbonyl fluoride was then vented and 8 g. of anhydrous hydrogen fluoride and 150 g. of sulfur tetrafluoride was added. This solution was shaken in a sealed reactor for 65 hrs. at 20±2°. The reaction mixture was poured into water, the methylene chloride layer separated and the resulting oil chromatographed on 60 g. of "Florisil" and eluted with hexane and acetone-hexane mixtures to yield 1.03 g. of an orange oil which had the infrared bands expected for 20,20-difluoro-6α-hydroxy-4-pregnen-3-one 6-trifluoromethyl ether.

N.M.R. ($H^1$) : 0.88 p.p.m. (H–18, triplet with J~2 c.p.s.), 1.23 p.p.m. (H–19), 5.21 p.p.m. (H–6, multiplet), 6.12 p.p.m. (H–4, doublet J~2 c.p.s.)

N.M.R. ($F^{19}$): +3353 c.p.s. (6—OCF$_3$), +5260 c.p.s. $\left( C_{20} \diagup^F_{\diagdown F}, \text{multiplet} \right)$ Infrared: $\lambda_{max.}$ 5.93μ ($C_3$=O), 6.12μ ($C_4$=$C_5$), 7.75–8.0μ (OCF$_3$) and $C_{20}$—F Using the general procedures specifically illustrated by the foregoing examples, 17α-acetoxy-6β-trifluoromethoxylprogesterone may be prepared by the following route:

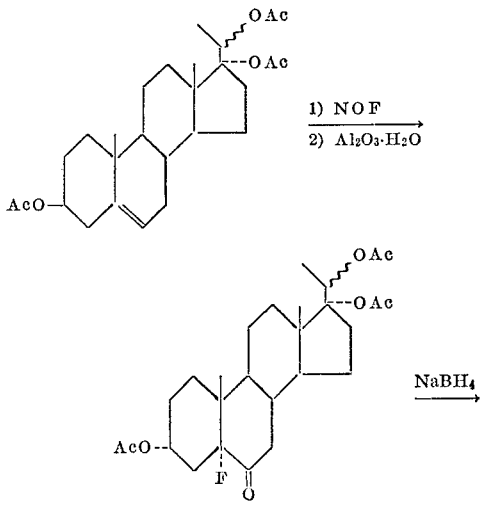

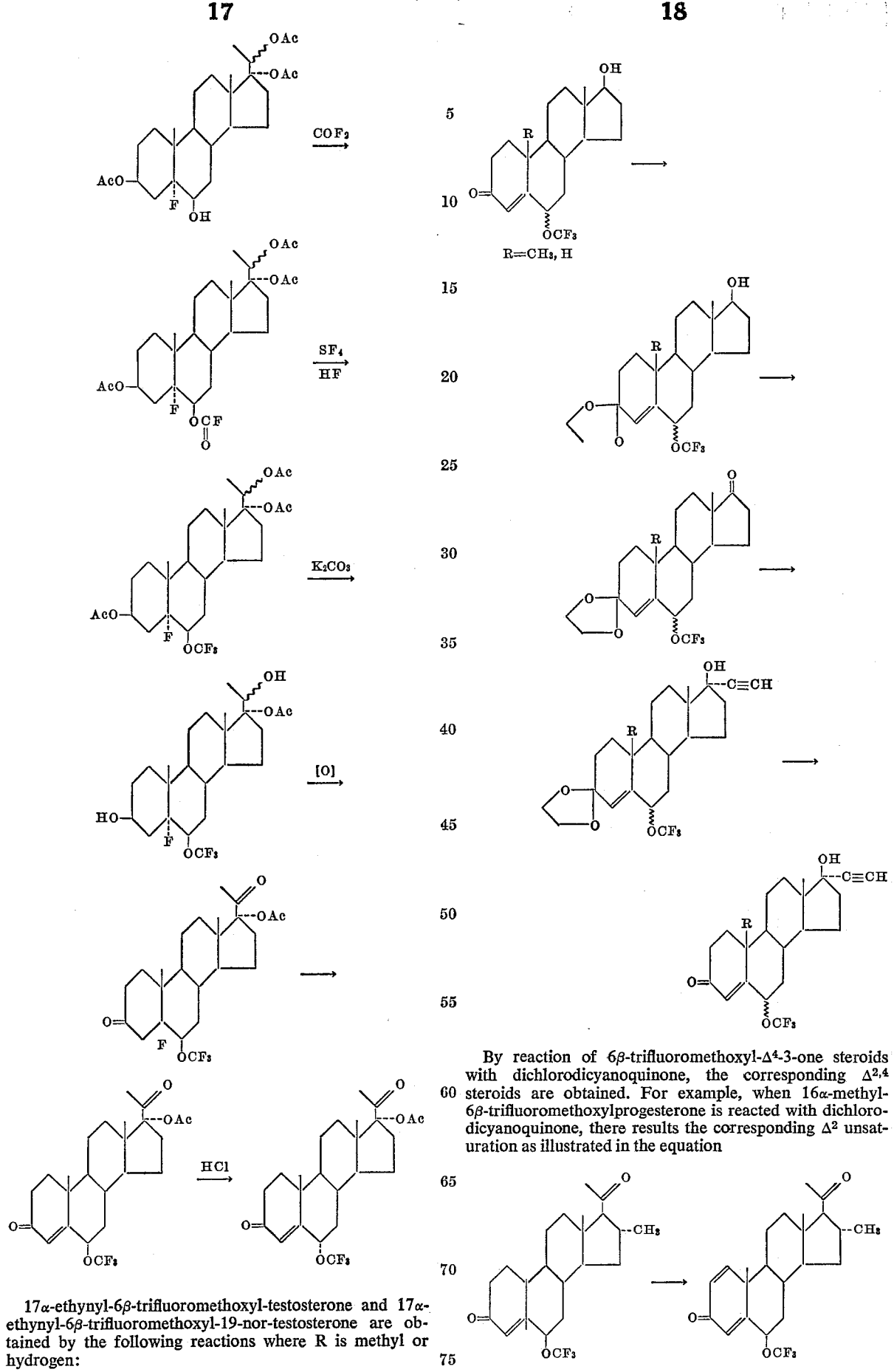

17α-ethynyl-6β-trifluoromethoxyl-testosterone and 17α-ethynyl-6β-trifluoromethoxyl-19-nor-testosterone are obtained by the following reactions where R is methyl or hydrogen:

By reaction of 6β-trifluoromethoxyl-$\Delta^4$-3-one steroids with dichlorodicyanoquinone, the corresponding $\Delta^{2,4}$ steroids are obtained. For example, when 16α-methyl-6β-trifluoromethoxylprogesterone is reacted with dichlorodicyanoquinone, there results the corresponding $\Delta^2$ unsaturation as illustrated in the equation Although most of the compounds in the preceding examples have been named as 6β-trifluoromethyl ether derivatives of steroids, the 6-position substituent can be in the 6α-position (Example XIV). Such is further illustrated by the following equation and description:

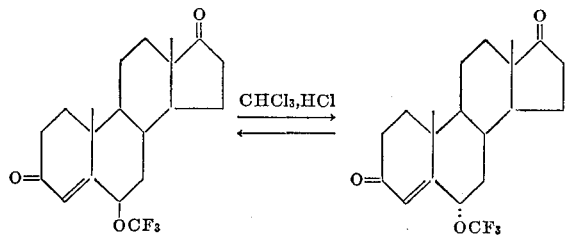

A small sample (54 mg.) of 4-androsten-3,17-dione-6β-ol trifluoromethyl ether was dissolved in ca. 1 ml. of deuteriochloroform. The solution, contained in an N.M.R. tube, was cooled to 0°, and anhydrous hydrochloric acid was passed into it for approximately fifteen minutes. The tube was capped and allowed to stand at room temperature. The vinyl hydrogen region of the N.M.R. spectrum was observed at various intervals. The allylic 6α proton of the starting material appears as a singlet at τ 4.05 while the allylic 6β proton of the 6α-trifluoromethoxyl isomer should appear as a doublet at slightly lower field. Equilibrium of the 6β-trifluoromethoxyl isomer in acidified chloroform leads to the appearance of a doublet at τ3.80 (J=2 c.p.s.). The progress of the equilibration, as measured by the ratio of areas of the 6α and 6β protons is shown below.

| Time (min.): | N.M.R. areas (6α H/6β H) |
|---|---|
| 0 | 1.00/0 |
| 45 | 1.00/0 |
| 240 | 0.874/0.126 |
| 1440 | 0.500/0.500 |
| 2880 | 0.333/0.667 |

In a similar manner 4-androsten-3,17-dione-6β-ol trifluoromethyl ether was dissolved in glacial acetic acid and while cooled to 15–20° anhydrous hydrochloric acid was passed in. The results are shown below.

| Time (min.): | N.M.R. areas (6α H/6β H) |
|---|---|
| 0 | 1.00/0 |
| 120 | 0.55/0.42 |
| 300 | 0.37/0.63 |
| 1320 | 0.12/0.88 |
| 1440 | 0.16/0.84 |
| 5520 | 0.13/0.87 |

EXAMPLE A

These compounds of this invention are active endocrine agents having activities that are similar to but greater than the corresponding steroids which do not contain the trifluoromethoxyl group.

For example the compound of Example XII, a 6-trifluoromethoxyl testosterone, is a potent antiandrogen. This was shown by the following procedure:

Male Swiss mice were castrated at age 21–23 days. Beginning on the day after castration, testosterone (in 0.1 ml. sesame oil, subcutaneous injection, 0.8 mg. total dose) was administered once daily for 7 consecutive days. At the same time, the compound of Example XII (in 0.2 ml. CMC/SC injection) was administered once daily for 7 consecutive days. At the same time, the compound of Example XII (in 0.2 ml. CMC/SC injection) was administered once daily for 7 consecutive days. The mice were autopsied on the day after the 1st injection. Prostrate and seminal vesicle weights were obtained and demonstrated that the compound was a potent antiandrogen when compared with progesterone, a standard inhibitor. The following table shows results obtained.

| Material administered | Total dose, mg. | Total dose testosterone, mg. | Relative weight seminal vesicles |
|---|---|---|---|
| O | 0 | 0 | 0.13 |
| O | 0 | 0.8 | 0.73 |
| Progesterone | 5 | 0.8 | 0.64 |
|  | 10 | 0.8 | 0.54 |
|  | 20 | 0.8 | 0.52 |
| Trifluoromethoxyl testosterone | 5 | 0.8 | 0.56 |
|  | 10 | 0.8 | 0.39 |

A further test showning anti-androgen activity of the compounds of this invention is as follows:

Day old male white Leghorn chicks were injected once with testosterone enanthate (0.5 mg./0.1 ml. sesame oil SC). Beginning on the same day, 16α-methyl-6β-trifluoromethoxyl-progesterone (see Example IV) was injected (about 0.03 mg./0.05 ml. sesame oil) daily for 7 days (total of 2 mg. of compound used). At autopsy on the eighth day the mean body weight for all chicks tested was substantially the same but the mean comb ratio for the control set was 0.48±0.03, for testosterone injection was 1.31±0.09 and for testosterone plus the above compound was 0.90±0.05. These data demonstrate the ability of the compound of Example IV to offset the androgenic response initiated by testosterone administration.

The embodiments of the invention in which an exclusive property or privilege is claimed are defined as follows:

1. The 6α- and 6β-trifluoromethoxyl steroid compounds of the formulas

I
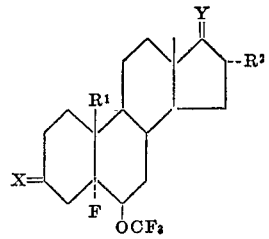

and

II
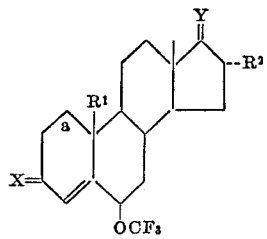

wherein $R^1$ and $R^2$, which may be the same or different, are hydrogen or methyl;

X is $\diagup^{OAc}_{\diagdown H}$ , $\diagup^{OH}_{\diagdown H}$ or =O;

Y is $\diagup^{CH(OAc)CH_3}_{\diagdown H}$ , $\diagup^{CH(OH)CH_3}_{\diagdown H}$ ,

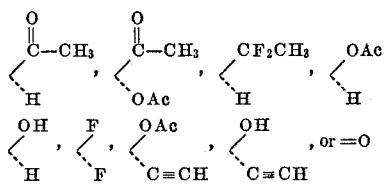

Ac is acetyl; and a is a single or a double carbon-carbon bond, with the proviso that when a is a double bond, R¹ is methyl.

2. The compound of Formula I of claim 1 wherein

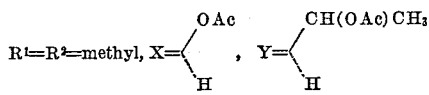

and the 6-trifluoromethoxyl group is β-oriented, 3,20-dihydroxy - 5α - fluoro - 6β - trifluoromethoxyl - 16α-methylpregnane diacetate.

3. The compound of Formula I of claim 1 wherein

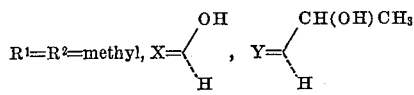

and the 6-trifluoromethoxyl group is β-oriented, 3,20-dihydroxy - 5α - fluoro - 6β - trifluoromethoxyl-16α-methylpregnane.

4. The compound of Formula I of claim 1 wherein

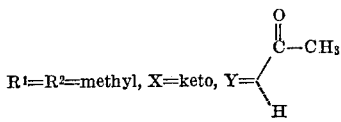

and the 6-trifluoromethoxyl group is β-oriented, 5α-fluoro-6β-trifluoromethoxyl-16α-methyl-pregna-3,20-dione.

5. The compound of Formula II of claim 1 wherein

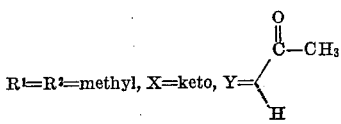

a = a single carbon-carbon bond and the 6-trifluoromethoxyl group is β-oriented, 16α-methyl-6β-trifluoromethoxylprogesterone.

6. The compound of Formula I of claim 1 wherein

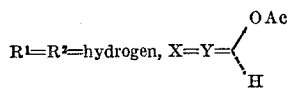

and the 6-trifluoromethoxyl group is β-oriented, 5α-fluoro-19-nor-androstane-3β, 6β-17β-triol 3,17-diacetate 6-trifluoromethyl ether.

7. The compound of Formula I of claim 1 wherein

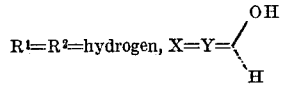

and the 6-trifluoromethoxyl group is β-oriented, 3β, 6β, 17β - trihydroxy - 5α - fluoro - 19 - nor - androstane 6-trifluoromethyl ether.

8. The compound of Formula I of claim 1 wherein

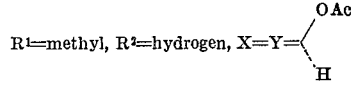

and the 6-trifluoromethoxyl group is β-oriented, 5α-fluoroandrostane-3α, 6β, 17β-triol 6-trifluoromethyl ether 3,17-diacetate.

9. The compound of Formula I of claim 1 wherein

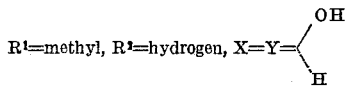

and the 6-trifluoromethoxy group is β-oriented, 5α-fluoroandrostane-3α,6β,17β-triol 6-trifluoromethyl ether.

10. The compound of Formula I of claim 1 wherein R¹=methyl, R²=hydrogen, X=Y=keto and the 6-trifluoromethoxyl group is β-oriented, 5α-fluoroandrostan-6β-ol-3,17-dione trifluoromethyl ether.

11. The compound of Formula II of claim 1 wherein R¹=methyl, R²=hydrogen, X=Y=keto, a=a single carbon-carbon bond and the 6-trifluoromethoxyl group is β-oriented, 4-androsten - 6β-ol - 3,17-dione trifluoromethyl ether.

12. The compound of Formula II of claim 1 wherein

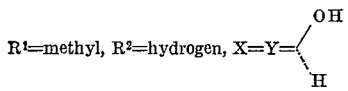

a=a single carbon-carbon bond and the 6-trifluoromethoxyl group is β-oriented, 4-androsten-3α,6β,17β-triol 6-trifluoromethyl ether.

13. The compound of Formula II of claim 1 wherein

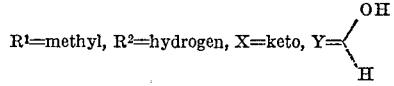

a=a single carbon-carbon bond and the 6-trifluoromethoxyl group is β-oriented, 6β,17β-dihydroxyandrost-4-en-3-one trifluoromethyl ether.

14. The compound of Formula II of claim 1 wherein

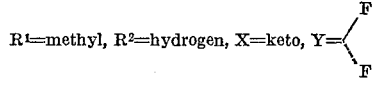

a=a single carbon-carbon bond and the 6-trifluoromethoxyl group is β-oriented, 17,17-difluoro-6β-hydroxy-4-androsten-3-one trifluoromethyl ether.

15. The compound of Formula II of claim 1 wherein

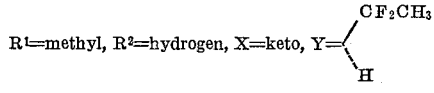

a=a single carbon-carbon bond and the 6-trifluoromethoxyl group is α-oriented, 20,20-difluoro-6α-hydroxy-4-pregnen-3-one 6-trifluoromethyl ether.

16. The compound of Formula II of claim 1 wherein

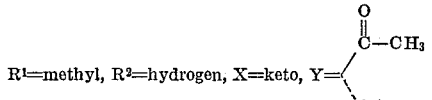

a=a single carbon-carbon bond and the 6-trifluoromethoxyl group is β-oriented, 17α-acetoxy-6β-trifluoromethoxylprogesterone.

17. The compound of Formula II of claim 1 wherein

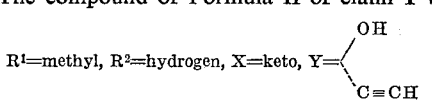

a=a single carbon-carbon bond and the 6-trifluoromethoxyl group is β-oriented, 17α-ethynyl-6β-trifluoromethoxyl-19-testosterone.

18. The compound of Formula II of claim 1 wherein

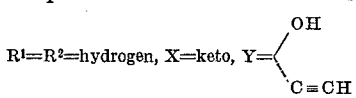

a=a single carbon-carbon bond and the 6-trifluoromethoxyl group is β-oriented, 17α-ethynyl-6β-trifluoromethoxyl-19-nor-testosterone.

19. The compound of Formula II of claim 1 wherein

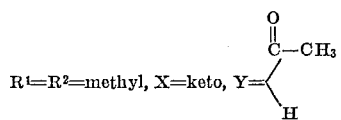

$a$=a carbon-carbon double bond and the 6-trifluoromethoxyl group is β-oriented, 6β-trifluoromethoxyl-16α-methyl-Δ¹-progesterone.

20. The compound of Formula II of claim 1 wherein $R^1$=methyl, $R^2$=hydrogen, X=Y=keto, $a$=a single carbon-carbon bond and the 6-trifluoromethoxyl group is α-oriented, 4-androsten-6α-ol-3,17-dione trifluoromethyl ether.

No references cited.

ELBERT L. ROBERTS, Primary Examiner

U.S. Cl. X.R.

260—239.55, 397.5; 424—243